United States Patent [19]
Fukushima

[11] Patent Number: 5,043,836
[45] Date of Patent: Aug. 27, 1991

[54] NOISE PROOF CAPACITOR UNIT FOR A VEHICULAR GENERATOR

[75] Inventor: Sumio Fukushima, Himeji, Japan

[73] Assignee: Mitsubishi Denki Kabushiki Kaisha, Tokyo, Japan

[21] Appl. No.: 550,847

[22] Filed: Jul. 10, 1990

[30] Foreign Application Priority Data

Jul. 12, 1989 [JP] Japan .............................. 1-82420[U]

[51] Int. Cl.⁵ ........................ H01G 4/00; H02K 11/00
[52] U.S. Cl. ................................ 361/301; 310/68 D
[58] Field of Search ............... 361/301, 328, 329, 302, 361/331, 3.^-383, 386, 388, 389; 363/126, 144, 145; 310/68 R, 68 D, 72

[56] References Cited
U.S. PATENT DOCUMENTS 4,543,504 9/1985 Iwaki et al. ..................... 310/68 D Primary Examiner—Donald A. Griffin
Attorney, Agent, or Firm—Sughrue, Mion, Zinn, Macpeak and Seas

[57] ABSTRACT

A noise-proof capacitor unit for a vehicular generator comprising an insulator (15) disposed between a positive-side heat sink (13) and a negative-side heat sink (14) of a rectifier for supporting them in an electrically insulating relationship from each other. The insulator (15) has integrally formed therein an insulating receptacle (17) for receiving and supporting therein a capacitor element (11). The capacitor unit also comprises a pair of terminal plates (21, 22) each mounted on the insulator (15) and having one end in electrical contact with the heat sink (13 or 14) and the other end connected to the terminal wire (12a or 12b) of the capacitor element.

2 Claims, 1 Drawing Sheet

NOISE PROOF CAPACITOR UNIT FOR A VEHICULAR GENERATOR

BACKGROUND OF THE INVENTION

This invention relates to a noise proof capacitor unit for a vehicular generator.

FIG. 1 is a sectional view illustrating a manner in which a conventional noise proof capacitor unit is mounted to a rectifier of a vehicular generator. In the figure, the noise proof capacitor 1, together with an insulator 2, is fitted between a heat sink positive side 3 and a heat sink negative side 4 of the rectifier, and the mounting portion 5 of the capacitor 1 is brought in contact with the heat sink negative side 4. Also, the capacitor 1 has a terminal 6 solder-connected to a terminal plate 8 integrally molded within an insulating plate 7 to be brought into contact with the heat sink positive side 3. Also, since an outer cylindrical portion 10 of the capacitor 1 is connected to the mounting portion 5 and has a different polarity than that of the terminal 6, an insulating paper 9 is inserted. Thus, both of the terminals of the capacitor 1 are respectively connected to the heat sink positive side 3 and the heat sink negative side 4.

Since the conventional noise proof capacitor unit is arranged as above described and the mounting portion 5 and the outer cylindrical portion 10 which are one of the terminals are exposed and not insulated, the resistance to the environment is poor. Also, the insulating paper 9 is required in order for the insulation between the terminal 6 which is the other terminal and the outer cylindrical portion 10, and the terminal 6 and the terminal plate 8 must be soldered upon the assembly of the rectifier, resulting in a complex structure leading to a troublesome manufacture. Further, since the insulator 2 and the mounting portion 5 must be fitted together and placed between the heat sink positive side 3 and the heat sink negative side 4 during the assembly of the rectifier, the assembling efficiency is disadvantageously poor.

Accordingly, one object of the present invention is to provide a noise-proof capacitor unit for a vehicular generator free from the above-discussed problems.

Another object of the present invention is to provide a noise-proof capacitor unit for a vehicular generator which has a superior resistance to environmental conditions.

Another object of the present invention is to provide a noise-proof capacitor unit for a vehicular generator which is simple in structure and easy to manufacture.

With the above objects in view, the noise proof capacitor unit for a vehicular generator of the present invention is characterized in that a capacitor element is held within an insulation integrally molded with an insulator disposed between a heat sink positive side and a heat sink negative side, and terminals of the capacitor element are connected to terminal plates mounted on surfaces of the insulator for connection to the positive-side and the negative side.

The capacitor element according to the present invention is held within the insulation and its resistance to the environment is improved. Also, both of the terminals of the capacitor element are connected to the respective terminal plates on the mounting surfaces of the insulator, so that the soldering operation is unneccessary during the assembly of the rectifier. Further, the conventional insulating paper 9 becomes unneccessary.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
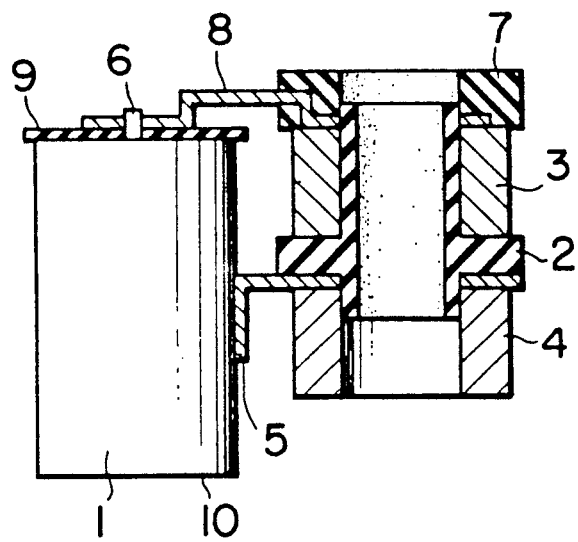
FIG. 1 is a vertical sectional front view of the conventional noise-proof capacitor unit for a vehicular generator.
Figure 2:
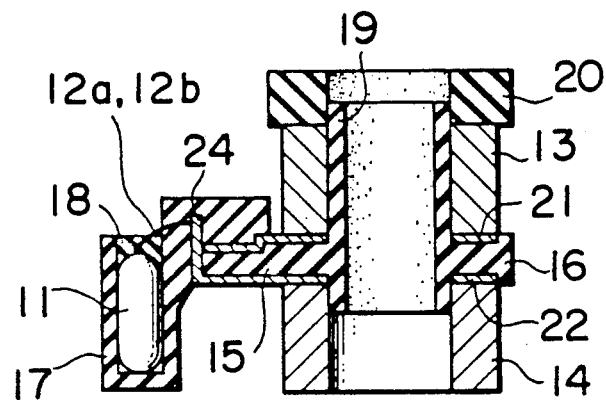
FIG. 2 is a vertical sectional front view of the noise-proof capacitor unit for a vehicular generator of the present invention.
Figure 3:
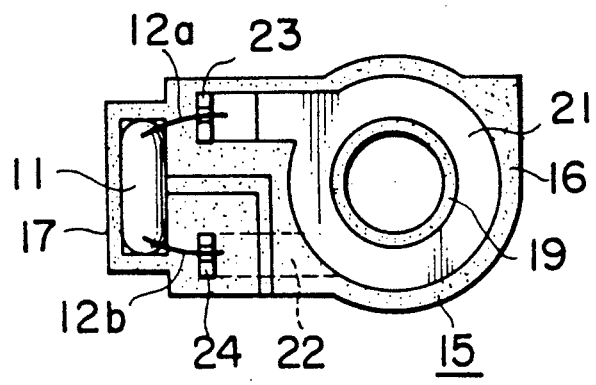
FIG. 3 is a p an view of the the noise-proof capacitor unit illustrated in FIG. 3.

An embodiment of the present invention will now be described in conjunction with FIGS. 2 and 3. A noise-proof capacitor unit for a vehicular generator comprises a capacitor element 11 having a pair of terminal wires 12a and 12b, a positive-side rectifier heat sink 13 and a negative-side rectifier heat sink 14. The heat sinks 13 and 14 are tubular in shape.

The capacitor unit also comprises an insulator 15 made of an electrically insulating resin material and disposed between the positive-side heat sink 13 and the negative-side heat sink 14 for supporting the heat sinks 13 and 14 in a separated, electrically insulated relationship from each other. The insulator 15 includes a plate-shaped main body 16 having a first end sandwiched between the rectifier heat sinks 13 and 14 and a second end having integrally formed thereon an insulating receptacle 17 in which the capacitor element 11 is received. The space above the capacitor element 11 is filled with a filler resin 18 to seal the opening of the insulating receptacle 17. The main body 16 also has a hollow cylindrical tube 19 extending through the main body 16 in the first end disposed between the heat sinks 13 and 14. The opposite ends of the cylindrical tube 19 projecting from the main body 16 are respectively fitted or inserted into the hollow cylindrical heat sinks 13 and 14 to support them. It is seen that one end (the upper end as viewed in FIG. 2) of the cylindrical tube 19 extends through the heat sink 13 and a ring shaped insulating plate 20 is attached thereto.

On the major surfaces of the insulator main body 16, a first terminal plate 21 and a second terminal plate 22 are securely mounted so that one end of the terminal plates 21 and 22 are brought into an electrical contact with the heat sinks 13 and 14 when the heat sinks 13 and 14 are put in place. The other end of the terminal plates 21 and 22 are bent upwardly at substantially right angles and embedded within the insulating resin material of the insulator 12 to provide tabs 23 and 24 for electrical connection to the terminal wires 12a and 12b, respectively. The construction as above discussed may preferably be obtained by the partial insert-molding of the terminal plates 21 and 22 within the main body 16 of the insulator 15.

In the above embodiment, since the capacitor element 11 is protected by being held within the insulating receptacle 17 and is sealed by the filler 18, the resistance to the environment is significantly improved. Also, since the insulator 15 may be simply fitted between the positive side heat sink 13 and the negative side heat sink 14 and both terminals 12a and 12b of the capacitor element 11 are soldered to the tabs 23 and 24 of the terminal plates 21 and 22 prior to the assembly of the rectifier, it is not necessary to carry out soldering during the assembly of the rectifier. Also, it is not necessary to apply an insulating paper which was needed in the prior art capacitor unit to electrically insulate the terminal from the outer casing. Therefore, the capacitor unit of the present invention is simple in structure and easy to manufacture.

Further, while the capacitor element 11 is held by a resin filler 18 within the insulating receptacle 17 in the above embodiment, a bonding agent may equally be used to hold and seal the capacitor element 11. Also, either one of the terminal plates 21 and 22 may be formed as a component separable from the insulator 15.

As has been described, according to the present invention, since the noise proof capacitor element is held within an insulation integrally molded with an insulator disposed between a heat sink positive side and a heat sink negative side, the resistance to the environment is improved. Also, the insulator may be simply fitted between the positive and the negative sides, and both terminals 12a and 12b are soldered beforehand, thereby making it unnecessary to carry out soldering during the assembly of the rectifier and to apply conventional insulating paper, resulting in a unit simple in structure and easy to manufacture.

What is claimed is:

1. A noise-proof capacitor unit for a vehicular generator, comprising:

a capacitor element having a pair of terminal wires;
   positive and negative heat sinks of a rectifier;
   an insulator disposed between said heat sinks for supporting them in an electrically insulating relationship from each other, said insulator having integrally formed therein an insulating receptacle for receiving therein said capacitor element; and
   a pair of terminal plates each mounted on said insulator and having one end in electrical contact with said heat sink and another end connected to said terminal wire of said capacitor element.

2. A noise-proof capacitor unit as claimed in claim 1, wherein said insulator comprises a plate-shaped main body integrally having one end sandwiched between the rectifier heat sinks and the other end secured to said insulating receptacle; and a hollow cylindrical tube extending through said one end of said main body and through said rectifier heat sinks for supporting it; each of said terminal plates being partially insert-molded with said main body of said insulator.

* * * * *